(12) United States Patent  
Li et al.

(10) Patent No.: US 7,523,676 B2  
(45) Date of Patent: Apr. 28, 2009

(54) ULTRASONIC FLOW RATE MEASUREMENT METHOD AND SYSTEM

(75) Inventors: Xue-Song Scott Li, Lexington, MA (US); John Albert Umina, Waltham, MA (US); Xiaolei Shirley Ao, Lexington, MA (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 11/567,818

(22) Filed: Dec. 7, 2006

(65) Prior Publication Data

US 2008/0134798 A1 Jun. 12, 2008

(51) Int. Cl.
*G01F 1/66* (2006.01)
(52) U.S. Cl. ..................... 73/861.25; 702/54
(58) Field of Classification Search .............. 73/861.18, 73/861.25–861.29; 702/54
See application file for complete search history.

(56) References Cited

U.S. PATENT DOCUMENTS

| | | | |
|---|---|---|---|
| 3,564,912 A | 2/1971 | Malone et al. | |
| 4,333,353 A | 6/1982 | Baumoel | |
| 5,188,113 A * | 2/1993 | Sato et al. | 600/455 |
| 5,437,194 A * | 8/1995 | Lynnworth | 73/861.27 |
| 6,067,861 A | 5/2000 | Shekarriz et al. | |
| 6,732,595 B2 | 5/2004 | Lynnworth | |
| 6,931,945 B2 | 8/2005 | Takeda et al. | |
| 2005/0011279 A1 | 1/2005 | Takeda et al. | |
| 2005/0241411 A1 | 11/2005 | Hishida et al. | |
| 2005/0245827 A1 | 11/2005 | Takeda et al. | |

FOREIGN PATENT DOCUMENTS

EP    1621856 A    2/2006

* cited by examiner

*Primary Examiner*—Harshad Patel
*Assistant Examiner*—Freddie Kirkland, III
(74) *Attorney, Agent, or Firm*—GE Global Patent Operation

(57) ABSTRACT

A method of determining the flow rate of a fluid in a conduit. Ultrasonic energy is directed through the conduit along multiple paths. The ultrasonic energy is detected and measured using a range gated Doppler technique to determine the velocity of the fluid at several points in the conduit. These point velocities are used to calculate the average flow rate of the fluid in the conduit.

38 Claims, 3 Drawing Sheets

ULTRASONIC FLOW RATE MEASUREMENT METHOD AND SYSTEM

FIELD OF THE INVENTION

Figure 1:
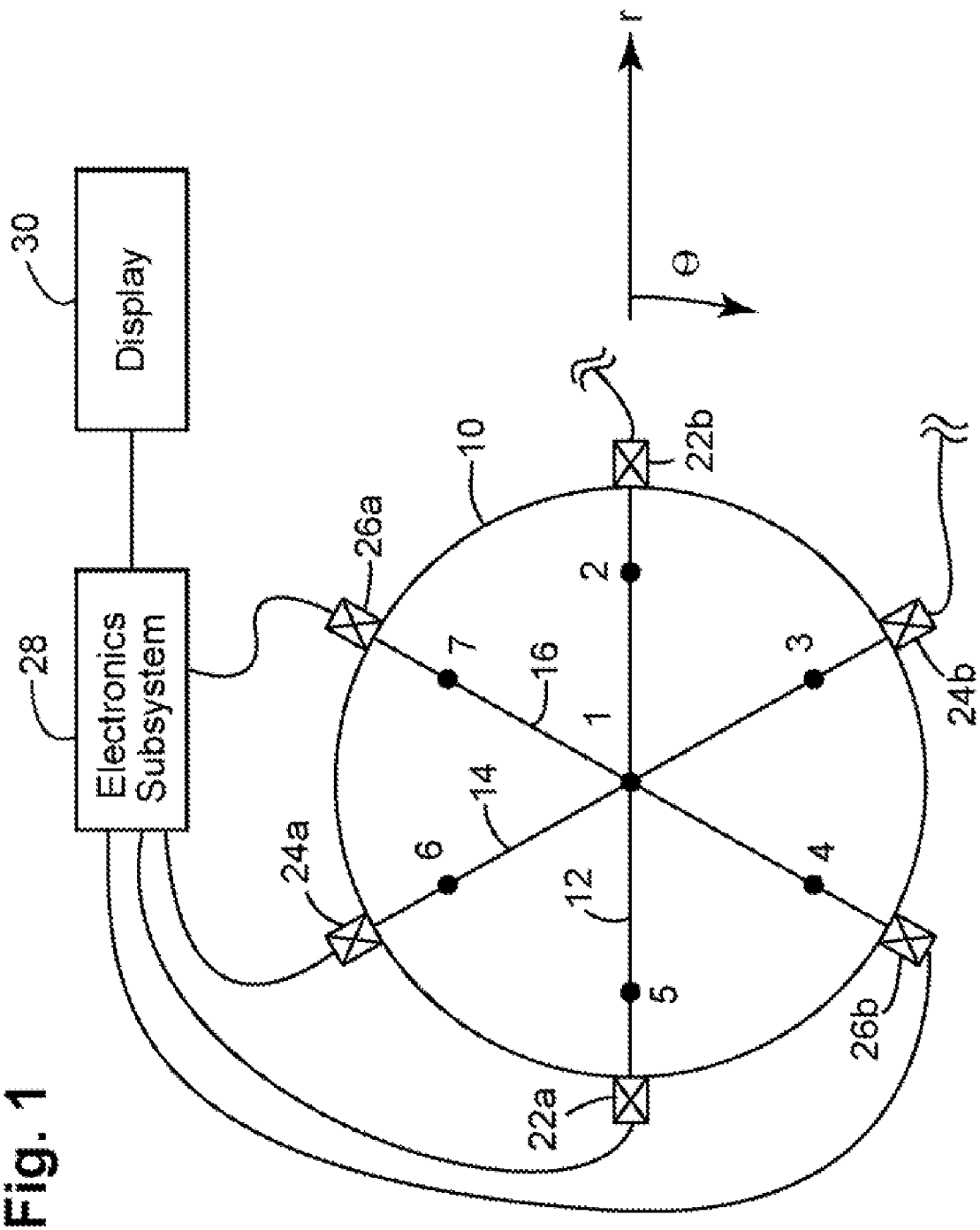

This subject invention relates to flow measurement techniques and systems and, in one preferred embodiment, ultrasonic measurement methods and systems.

BACKGROUND OF THE INVENTION

Ultrasonic flow meters are often used to measure the flow rate of a fluid in a conduit. Different flow meters are based on several different physics principles. The most commonly used techniques are transit time, Doppler and cross correlation tag. All three techniques measure collective effects caused by the total fluid flow inside the conduit which are then analytically or empirically corrected by a factor to derive the mean flow rate of the flow inside the conduit. Typically, the correction factor is flow rate dependent and invalid if the flow profile is not symmetrical. However, Doppler techniques can be designed such way that signal propagation from wall to wall can be selectively analyzed or scanned. See U.S. Pat. Nos. 3,564,912; 6,732,595; 6,931,945 and Published U.S. Patent Application Nos. US2005/0245827; US2005/0241411; and US2005/0011279 all incorporated herein by this reference.

In all ultrasonic flow meters, transducers transmit signals to and receive signals from the fluid inside of a conduit. The transducers can be wetted or clamp-on. The wetted method involves a direct contact of the front face of the transducer with the fluid generally though a pipe nozzle. The clamp-on technique involves clamping the transducers to the outside of the conduit and beneficially does not change the integrity of the conduit surface. In the most common application, where the conduit is circular in cross section, high accuracy flow measurement by the transit time technique often involves the use of a multi-path technique with one pair of transducers per path is applied. It is preferred that a minimum of one path be located in the chordal location to measure undeveloped flow. Undeveloped flow generally does not have high symmetry in its profile and therefore cannot be well characterized by existing theories. However, the nozzles for the chordal path are generally more difficult to fabricate than for a diameter path. Misalignment and mislocations can contribute to inaccurate flow measurements. Furthermore, in the case of clamp-on style transducers, it is difficult to obtain a useful chordal path without changing the integrity of the existing pipe surface.

Thus, transducer pairs located on chordal paths through the flow cannot generally be of the clamp-on type and/or involve difficulties in mechanical design and construction. Some flow meter systems are difficult to set up for use on existing conduits. Misalignment and other factors can contribute to inaccurate flow measurements. Importantly also, the accuracy of a given flow meter often depends on whether or not the flow is symmetric or asymmetric. Additionally, for asymmetric flow, using range gated Doppler techniques to measure flow rate and obtaining a profile correction factor by scanning wall to wall of the conduit requires at least two paths and time-consuming scanning, which can compromise measurement accuracy.

SUMMARY OF THE INVENTION

The subject invention provides a more accurate method of determining the average or volumetric flow rate of a fluid in a conduit. Clamp-on type transducers can be used, and the transducers need not be—but can be—located on chordal paths. The method of this invention is simple to implement, fast in response, and is highly accurate. The method is also accurate irrespective of whether the fluid flow profile is symmetric or non-symmetric.

The subject invention results from the realization that if a point velocity measurement method such as a range gated Doppler technique is employed to obtain a flow rate with no need of using a measured or derived profile correction factor, then a fast and accurate measurement of the mean flow rate can be obtained. By summing a very limited number of data points with a numerical weighting factor applied to each one point, the mean flow rate can be determined. The method is fast, simple to implement and highly accurate irrespective of whether the flow profile is symmetric or non-symmetric.

The subject invention, however, in other embodiments, need not achieve all these objectives and the claims hereof should not be limited to structures or methods capable of achieving these objectives.

This invention features a method of determining the average or volumetric flow rate of a fluid in a conduit. The preferred method includes directing ultrasonic energy through the conduit along multiple paths, detecting and measuring the ultrasonic energy using a range gated Doppler technique to determine the velocity of the fluid at several points in the flow, and determining, from the several point velocities, the average or volumetric flow rate of the fluid in the conduit.

The ultrasonic energy can be directed along diameter paths through the conduit and the fluid. Typically, the average flow rate of each of the point velocities is multiplied by a predetermined weighting factor. The weighted point velocities are then summed. Determining the volumetric fluid flow rate typically includes multiplying that summation by the area of the conduit. In one example, each weighting factor for each point velocity is a function of the position of the point in the fluid flow. Preferably, point velocities at the center of the conduit and fluid flow and at least one point in each quadrant of the conduit and fluid are measured. At least seven point velocities are typically measured.

Transducers on the outside of the conduit can be used to transmit and detect the ultrasonic energy. The transducers can act as transmitters and receivers alternatively controlled by the electronics or can be used in pairs. The transducers of each pair can be located on opposite sides of the conduit or the same side of the conduit. In one example, three pairs of transducers were used.

A fluid flow rate measurement system in accordance with this invention typically includes an ultrasonic transducer subsystem configured to direct and measure ultrasonic energy through a conduit and the fluid therein along multiple paths and to determine the velocity of the fluid at several points in the conduit using a range gated Doppler technique. An electronic subsystem is responsive to the ultrasonic transducer subsystem and is configured to determine, from the several point velocities, the average flow rate or the volumetric flow rate of the fluid in the conduit.

In one example, the volumetric flow rate of a fluid in a conduit is calculated by detecting the velocity of the fluid at several points in the fluid flow, multiplying each of the point velocities by a predetermined weighting factor, summing the weighted point velocities, and multiplying the summation by the area of the conduit. Preferably, the point velocities are determined by directing ultrasonic energy through the conduit and fluid along multiple paths and detecting and measuring the ultrasonic energy using a range gated Doppler technique.

One fluid flow rate measurement system in accordance with this invention features a measurement subsystem configured to determine the velocity of the fluid at several points in the fluid in the conduit and an electronic subsystem responsive to the measuring subsystem and configured to determine, from the several point velocities, the average (or volumetric) flow rate of the fluid in the conduit. Typically, the measurement subsystem includes an ultrasonic transducer arrangement configured to direct and measure ultrasonic energy through the conduit and fluid along multiple paths to determine the velocity of the fluid at several points in the fluid flow using a range gated Doppler technique.

This invention features a method of determining the flow rate of a fluid in a conduit, the method including directing ultrasonic energy through the conduit and fluid along multiple paths, detecting and measuring the ultrasonic energy using a range gated Doppler technique to determine the velocity of the fluid at several points in the fluid in the conduit, and determining, from the several point velocities, the average flow rate of the fluid in the conduit. The ultrasonic energy may be directed along diameter paths through the conduit and the fluid. Determining the average flow rate includes multiplying each of the point velocities by a predetermined weighting factor and summing the weighted point velocities. Each weighting factor for each point velocity is a function of the position of the point in the fluid in the conduit. Determining the volumetric flow rate includes multiplying the summation by the area of the conduit. In one example, measuring includes determining the point velocities at the center of the fluid in the conduit and at least one point in each quadrant of the fluid in the conduit, and at least seven point velocities may be measured. In one variation, directing ultrasonic energy may include employing transducers clamped on the outside of the conduit. The transducers may be in pairs, the transducers of each pair on opposite sides of the conduit. There may be three pairs of transducers. In another variation, directing ultrasonic energy includes employing wetted transducers.

This invention also features a fluid flow rate measurement system including an ultrasonic transducer subsystem configured to direct and measure ultrasonic energy through a conduit fluid flow therein along multiple paths and to determine the velocity of the fluid at several points in the fluid in the conduit using a range gated Doppler technique. The fluid flow rate measurement system includes an electronic subsystem, responsive to the ultrasonic transducer subsystem, configured to determine, from the several point velocities, the average flow rate of the fluid in the conduit. In one example, the transducers are arranged to direct ultrasonic energy along diameter paths through the conduit and the fluid. In another example, the transducers are arranged to include directing ultrasonic energy along chordal paths through the conduit and the fluid. The electronic subsystem is configured to multiply each of the point velocities by a stored weighting factor and to sum the weighted point velocities. Each stored weighting factor for each point velocity is a function of the position of the point in the fluid in the conduit. The electronic subsystem may also be configured to multiply the summation by the cross-sectional area of the conduit and to output the multiple as a volumetric flow rate. The ultrasonic transducer subsystem is typically configured to determine the point velocities at the center of the fluid in the conduit and at at least one point in each quadrant of the fluid in the conduit, and at least seven point velocities are typically measured. The transducers of the ultrasonic transducer subsystem may be clamped on the outside of the conduit or the transducers of the ultrasonic transducer subsystem may be wetted transducers. In one variation, the transducers are in pairs, the transducers of each pair on opposite sides of the conduit, and in another variation, the transducers are in pairs, the transducers of each pair on the same side of the conduit. There may be three pairs of transducers.

This invention further features a method of determining the volumetric flow rate of a fluid in a conduit, the method including detecting the velocity of the fluid at several points in the fluid in the conduit, and determining, from the several point velocities, the volumetric flow rate of the fluid in the conduit by multiplying each of the point velocities by a predetermined weighting factor, summing the weighted point velocities, and multiplying the summation by the area of the conduit. The point velocities may be determined by directing ultrasonic energy through the conduit and the fluid along multiple paths and detecting and measuring the ultrasonic energy using a range gated Doppler technique. The ultrasonic energy may be directed along diameter paths through the conduit and the fluid, or the ultrasonic energy may be directed along chordal paths through the conduit and the fluid. In one example, each weighting factor for each point velocity is a function of the position of the point in the fluid in the conduit, and measuring includes determining the point velocities at the center of the fluid in the conduit and at at least one point in each quadrant of the fluid in the fluid in the conduit. There may be at least seven point velocities measured. Directing ultrasonic energy may include employing transducers clamped on the outside of the conduit, in which the transducers are in pairs, the transducers of each pair on opposite sides of the conduit, or directing may include employing wetted transducers. There may be three pairs of transducers utilized.

This invention also features a fluid flow rate measurement system including a measurement subsystem configured to determine the velocity of the fluid flow at at least two points in the fluid in the conduit, and an electronic subsystem responsive to the measuring subsystem and configured to determine, from the several point velocities, the flow rate of the fluid in the conduit. The measurement subsystem will typically include an ultrasonic transducer arrangement configured to direct and measure ultrasonic energy through the conduit and the fluid along multiple paths to determine the velocity of the fluid at several points in the fluid in the conduit using a range gated Doppler technique. The ultrasonic energy may be directed along diameter paths through the conduit and the fluid in one example. Determining the average flow rate includes multiplying each of the point velocities by a predetermined weighting factor and summing the weighted point velocities. Each weighting factor for each point velocity is a function of the position of the point in the fluid in the conduit. Determining the volumetric flow rate includes multiplying the summation by the area of the conduit. Measuring may include determining the point velocities at the center of the fluid in the conduit and at at least one point in each quadrant of the fluid in the conduit, and there may be at least seven point velocities which are measured. In one embodiment the ultrasonic transducer arrangement includes transducers clamped on the outside of the conduit. The transducers may be in pairs, the transducers of each pair on opposite sides of the conduit, or the transducers of each pair on the same side of the conduit. In one variation, there are three pairs of transducers.

BRIEF DESCRIPTION OF THE SEVERAL
VIEWS OF THE DRAWINGS

Figure 2:
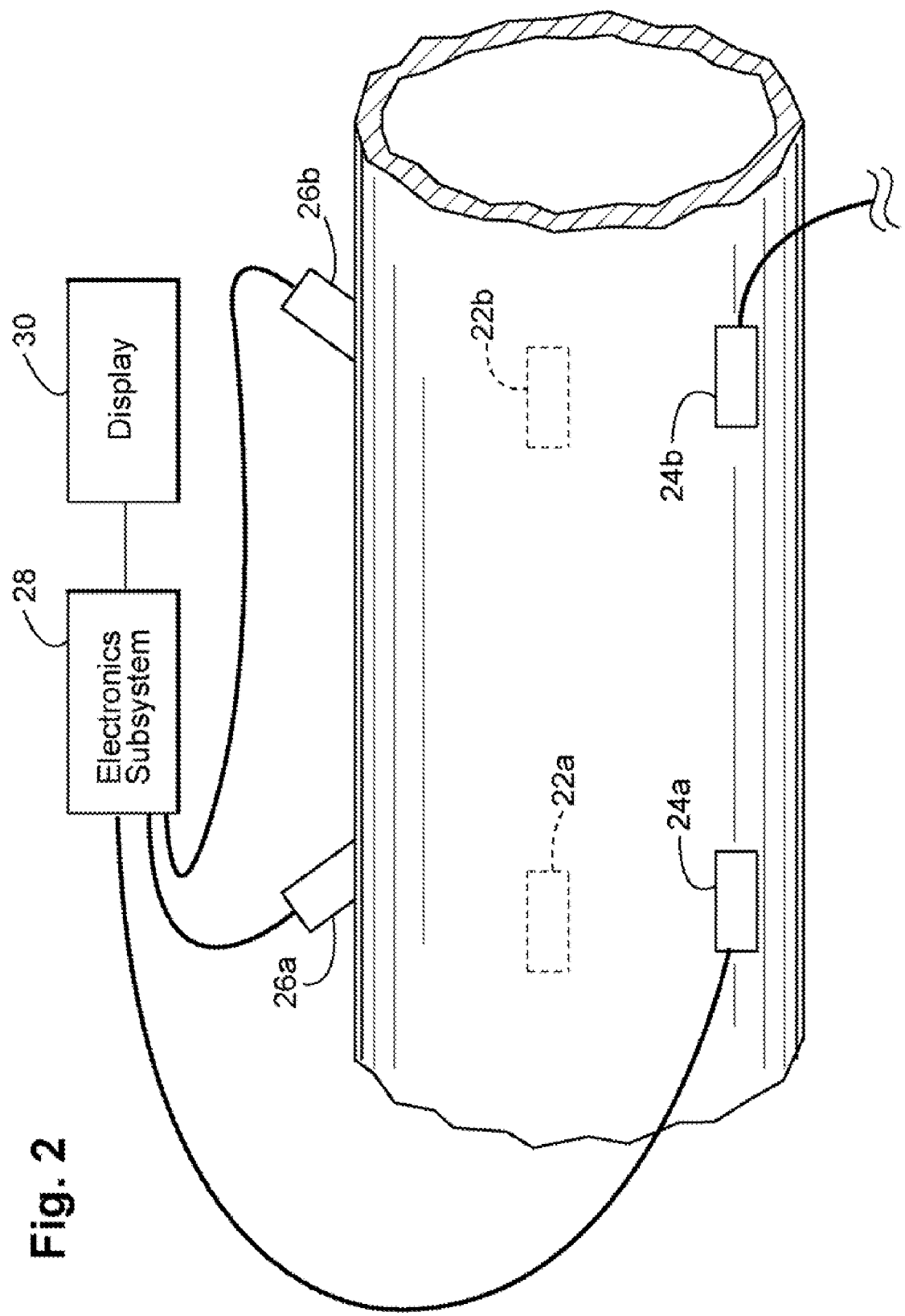
Figure 3:
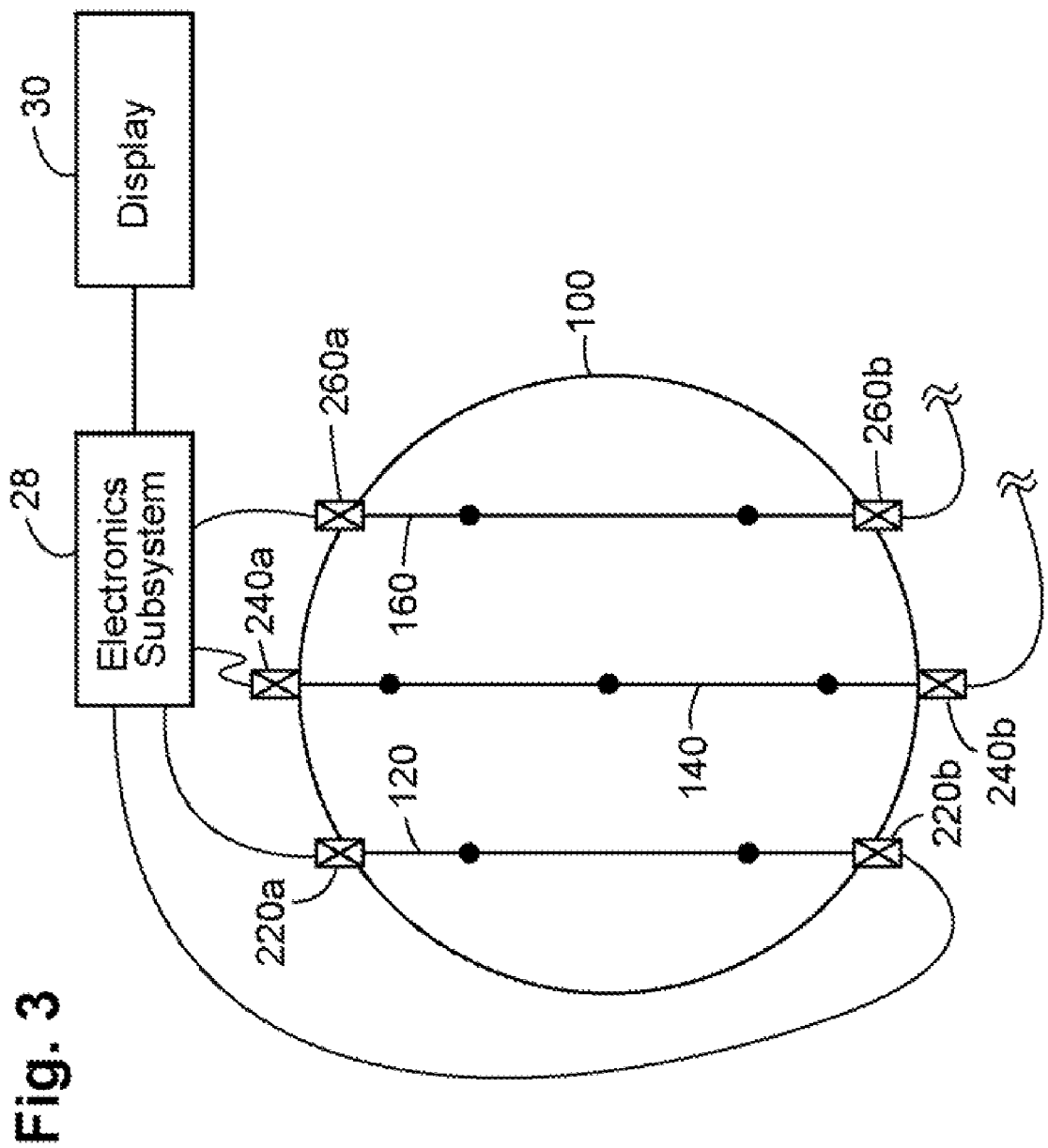

Other objects, features and advantages will occur to those skilled in the art from the following description of a preferred embodiment and the accompanying drawing, in which:

FIG. 1 is a highly schematic cross-sectional view showing an embodiment of an ultrasonic flow rate measurement system showing how, in one example, the method of determining the average flow rate of a fluid in a conduit can be implemented;

FIG. 2 is a side perspective view of an embodiment of an ultrasonic flow rate measurement system showing how, in another example, the method of determining the average flow rate of a fluid in a conduit can be implemented; and FIG. 3 is a highly schematic cross-sectional view showing another embodiment of an ultrasonic flow rate measurement system showing how, in a further example, the method of determining the average flow rate of a fluid in a conduit can be implemented.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In accordance with one example of the subject invention, ultrasonic energy is directed through conduit 10 and through the fluid flow therein along multiple paths, in one embodiment diameter paths 12, 14, and 16, FIG. 1 via clamp-on transducer pairs 22a and 22b, 24a and 24b, and 26a and 26b, respectively. Each transducer of each pair typically acts alternately as a transmitter and then as a receiver. The ultrasonic energy detected by one of the transducers of each pair is measured and processed via electronic subsystem 28 which also is typically used to control firing of the transducers with electric pulses. Also, as shown in FIG. 2, the transducer pairs need not be on opposite sides of the conduit, but may be on the same side of the conduit.

Electronic subsystem 28, in this example, is configured in part to employ a range gated Doppler technique to determine the flow at several points 1-7 in the fluid flow. The points chosen typically include the center of (the fluid flow in) the conduit (point velocity 1) and also points or at least one point in each quadrant of (the fluid flow in) the conduit.

The range gated Doppler technique was initially introduced in medical diagnostic instruments where the transmission signal is a group of pulses. The frequency shift in the scattered signal received at different time windows is analyzed to obtain the point velocities of scattered energy located at different distances from the receiver.

Each point velocity $V_i$ is then used in connection with stored weighting factors ($w_i$) for each point and the known radius (R) of the conduit 10 to calculate, via a processor of electronic subsystem 28 appropriately programmed, the volumetric flow rate $\Omega$ as follows:

$$\Omega = \pi R^2 \times \sum_{i=1}^{7} w_i \times v_i \quad (1)$$

The calculated volumetric flow rate can then be displayed on display 30. When the average flow rate is desired, it may calculated using equation (1) without multiplying by the cross-sectional area, i.e. by eliminating $\pi R^2$ from the equation (1). The predetermined weighting factors $W_i$ are typically stored in a memory device and are function of the position of each point 1-7 in the flow. The appropriate weighting factors can be determined by those skilled in the art. See, for example, A. H. Strod, "Approximate Calculation of Multiple Integrals", Chapter 3 (Prentice-Hall), incorporated herein by this reference.

Multi-path ultrasonic flow measurement systems have been used for high accuracy measurement applications. The typical systems utilize a two-step sequence, first measuring mean velocities along predetermined (parallel) paths, followed by a one-dimensional numerical integration, utilizing quadrature rules, to achieve the volumetric or average flow rate.

Presently, multi-path systems are often used for obtaining high accuracy flow measurement. Considering that profiles are generally unknown, at least one of the paths is required to be located on off-diameter chords to obtain the high accuracy. That configuration presents mechanically challenging installation of the transducers and often the less than perfectly mounted transducers result in sacrifice of accuracy of the measurements. Multi-path ultrasonic systems that use off-diameter chords cannot be applied to clamp-on measurements as a result of Snell's law.

The new method of measuring the volumetric flow rate involves a two-dimensional Gauss Quadrature method. Instead of measuring line average velocities along different paths, flow velocities at seven or more points are measured as discussed above. Although this can be achieved in different ways using different measurement subsystems, the range-gated Doppler technique is preferred. With the measured velocities at seven points, the volumetric flow rate over the pipe cross section is then calculated via equation 1 above.

In one example of a circular pipe, the preferred polar coordinates of the seven points and associated weighting factors are given in Table 1 below.

TABLE 1

| i | r | θ(°) | $w_i$ |
|---|---|------|-------|
| 1 | 0 | 0 | 1/4 |
| 2 | $\sqrt{2/3}$ | 0 | 1/8 |
| 3 | $\sqrt{2/3}$ | 60 | 1/8 |
| 4 | $\sqrt{2/3}$ | 120 | 1/8 |
| 5 | $\sqrt{2/3}$ | 180 | 1/8 |
| 6 | $\sqrt{2/3}$ | 240 | 1/8 |
| 7 | $\sqrt{2/3}$ | 300 | 1/8 |

In contrast to conventional multi-path systems, this embodiment of the method can eliminate off-diameter chord transducer mounting. The 2D-Quadrature method has been tested in simulations. The results indicate that the method of the subject invention yields very high accuracy, typically much better than conventional multi-path systems. In a straight pipe with a well established flow profile, the simulated flow rated was 12.55978 and the flow rate as determined by the method described above was 12.55523 resulting in an error of 0.036%. In a pipe where the flow rate was determined right after an elbow where the flow profile is far from symmetric, the simulated flow rate was 0.318423, the flow rate as determined by the method of the subject invention was 0.318686 resulting in an error of 0.08%.

The result of this embodiment is a new method of determining the flow rate of a fluid in a conduit wherein clamp-on type transducers can be used and they need not be located on chordal paths. The method is simple to implement, highly accurate, reduces the chance of transducer misalignment, and is accurate irrespective of whether the flow is symmetric or non-symmetric.

Although the use of transducers on off-diameter paths presents various challenges, e.g. with respect to installation, the use of clamp-on transducers and exclusively diameter paths is not a limitation of the present invention. As shown in the embodiment of FIG. 3, ultrasonic energy is directed through conduit 100 along multiple paths 120, 140 and 160 via wetted transducer pairs 220a and 220b, 240a and 240b, and 260a and 260b, respectively. In this embodiment, paths 120 and 160 are chordal paths. Other than the inclusion of wetted transducer pairs and chordal paths, this embodiment operates similarly to the embodiment described herein utilizing clamp-on transducers on diameter paths, also resulting in a more accurate determination of fluid flow rate.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method of determining the flow rate of a fluid in a conduit, the method comprising:
    directing ultrasonic energy through the conduit and fluid along multiple paths;
    detecting and measuring the ultrasonic energy using a range gated Doppler technique to determine the velocity of the fluid at several points in the fluid in the conduit; and
    determining, from the several point velocities, the average flow rate of the fluid in the conduit, wherein the determination of the average flow rate includes multiplying each of the point velocities by a predetermined weighting factor and summing the weighted point velocities, each weighting factor for each point velocity being a function of the position of the point in the fluid in the conduit.

2. The method of claim 1 in which the ultrasonic energy is directed along diameter paths through the conduit and the fluid.

3. The method of claim 1 in which determining the volumetric flow rate includes multiplying the summation by the area of the conduit.

4. The method of claim 1 in which measuring includes determining the point velocities at the center of the fluid in the conduit and at least one point in each quadrant of the fluid in the conduit.

5. The method of claim 4 in which at least seven point velocities are measured.

6. The method of claim 1 in which directing includes employing transducers clamped on the outside of the conduit.

7. The method of claim 6 in which the transducers are in pairs, the transducers of each pair on opposite sides of the conduit.

8. The method of claim 7 in which there are three pairs of transducers.

9. The method of claim 1 in which directing ultrasonic energy includes employing wetted transducers.

10. A fluid flow rate measurement system comprising:
    an ultrasonic transducer subsystem configured to direct and measure ultrasonic energy through a conduit fluid flow therein along multiple paths and to determine the velocity of the fluid at several points in the fluid in the conduit using a range gated Doppler technique; and
    an electronic subsystem, responsive to the ultrasonic transducer subsystem, configured to determine, from the several point velocities, the average flow rate of the fluid in the conduit, wherein the electronic subsystem is configured to multiply each of the point velocities by a stored weighting factor and to sum the weighted point velocities, each stored weighting factor for each point velocity being a function of the position of the point in the fluid in the conduit.

11. The system of claim 10 in which the transducers are arranged to direct ultrasonic energy along diameter paths through the conduit and the fluid.

12. The system of claim 10 in which the transducers are arranged to include directing ultrasonic energy along chordal paths through the conduit and the fluid.

13. The system of claim 10 in which the electronic subsystem is configured to multiply the summation by the cross-sectional area of the conduit and to output the multiple as a volumetric flow rate.

14. The system of claim 10 in which the ultrasonic transducer subsystem is configured to determine the point velocities at the center of the fluid in the conduit and at least one point in each quadrant of the fluid in the conduit.

15. The system of claim 14 in which at least seven point velocities are measured.

16. The system of claim 10 in which the transducers of the ultrasonic transducer subsystem are clamped on the outside of the conduit.

17. The system of claim 16 in which the transducers are in pairs, the transducers of each pair on opposite sides of the conduit.

18. The system of claim 17 in which there are three pairs of transducers.

19. The system of claim 16 in which the transducers are in pairs, the transducers of each pair on the same side of the conduit.

20. The system of claim 10 in which the transducers of the ultrasonic transducer subsystem are wetted transducers.

21. A method of determining the volumetric flow rate of a fluid in a conduit, the method comprising:

detecting the velocity of the fluid at several points in the fluid in the conduit; and determining, from the several point velocities, the volumetric flow rate of the fluid in the conduit by multiplying each of the point velocities by a predetermined weighting factor, summing the weighted point velocities, and multiplying the summation by the area of the conduit, wherein the ultrasonic energy is directed along diameter paths through the conduit and the fluid, and wherein each weighting factor for each point velocity is a function of the position of the point in the fluid in the conduit.

22. The method of claim 21 in which the point velocities are determined by directing ultrasonic energy through the conduit and the fluid along multiple paths and detecting and measuring the ultrasonic energy using a range gated Doppler technique.

23. The method of claim 22 in which the ultrasonic energy is directed along chordal paths through the conduit and the fluid.

24. The method of claim 22 in which directing includes employing transducers clamped on the outside of the conduit.

25. The method of claim 24 in which the transducers are in pairs, the transducers of each pair on opposite sides of the conduit.

26. The method of claim 25 in which there are three pairs of transducers.

27. The method of claim 22 in which directing includes employing wetted transducers.

28. The method of claim 21 in which measuring includes determining the point velocities at the center of the fluid in the conduit and at least one point in each quadrant of the fluid in the fluid in the conduit.

29. The method of claim 28 in which there are at least seven point velocities measured.

30. A fluid flow rate measurement system comprising:
a measurement subsystem configured to determine the velocity of the fluid flow at least two points in the fluid in the conduit; and an electronic subsystem responsive to the measuring subsystem and configured to determine, from the several point velocities, the flow rate of the fluid in the conduit, wherein the measurement subsystem includes an ultrasonic transducer arrangement configured to direct and measure ultrasonic energy through the conduit and the fluid along multiple paths to determine the velocity of the fluid at several points in the fluid in the conduit using a range gated Doppler technique, and wherein determining the average flow rate includes multiplying each of the point velocities by a predetermined weighting factor and summing the weighted point velocities, each weighting factor for each point velocity being a function of the position of the point in the fluid in the conduit.

31. The system of claim 30 in which the ultrasonic energy is directed along diameter paths through the conduit and the fluid.

32. The system of claim 30 in which determining the volumetric flow rate includes multiplying the summation by the area of the conduit.

33. The system of claim 30 in which measuring includes determining the point velocities at the center of the fluid in the conduit and at least one point in each quadrant of the fluid in the conduit.

34. The system of claim 33 in which at least seven point velocities are measured.

35. The system of claim 30 in which the ultrasonic transducer arrangement includes transducers clamped on the outside of the conduit.

36. The system of claim 35 in which the transducers are in pairs, the transducers of each pair on opposite sides of the conduit.

37. The system of claim 36 in which there are three pairs of transducers.

38. The system of claim 35 in which the transducers are in pairs, the transducers of each pair on the same side of the conduit.

* * * * *

UNITED STATES PATENT AND TRADEMARK OFFICE
CERTIFICATE OF CORRECTION

PATENT NO. : 7,523,676 B2
APPLICATION NO. : 11/567818
DATED : April 28, 2009
INVENTOR(S) : Li et al.

It is certified that error appears in the above-identified patent and that said Letters Patent is hereby corrected as shown below:

In Column 1, Line 32, delete "though" and insert -- through --, therefor.

In Column 3, Line 61, delete "at at" and insert -- at --, therefor.

In Column 4, Line 23, delete "at at" and insert -- at --, therefor.

In Column 4, Line 33, delete "at at" and insert -- at --, therefor.

In Column 4, Line 52, delete "at at" and insert -- at --, therefor.

In Column 5, Lines 62-63, in Equation (1), delete "$v_i$" and insert -- $V_i$ --, therefor.

In Column 6, Line 3, delete "$W_i$" and insert -- $w_i$ --, therefor.

Signed and Sealed this

Second Day of June, 2009

JOHN DOLL
*Acting Director of the United States Patent and Trademark Office*